UNITED STATES PATENT OFFICE.

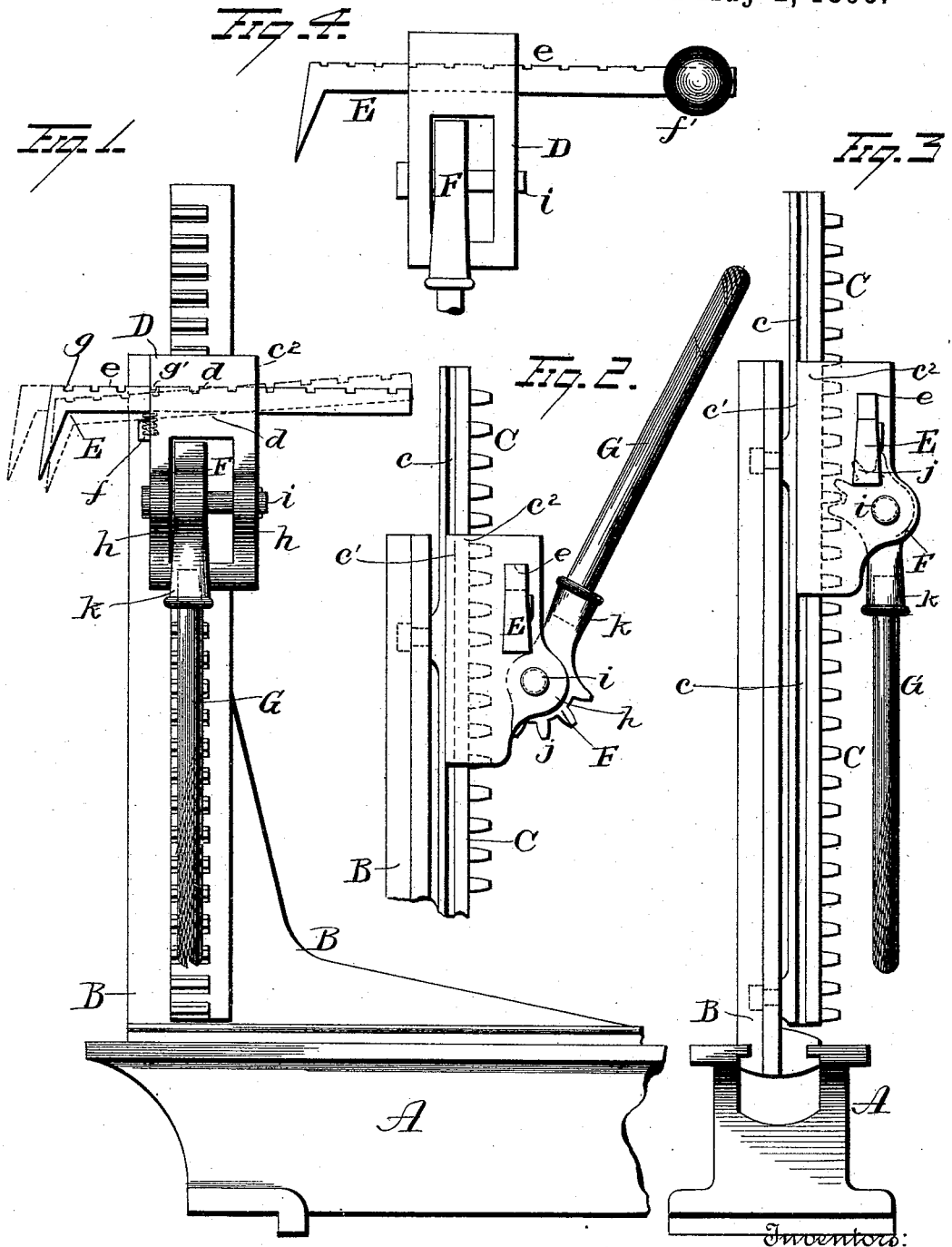

SAMUEL HAUCK AND GEORGE S. COMSTOCK, OF MECHANICSBURG, PENNSYLVANIA; SAID HAUCK ASSIGNOR TO SAID COMSTOCK.

SAWMILL-DOG.

SPECIFICATION forming part of Letters Patent No. 496,650, dated May 2, 1893.

Application filed August 13, 1892. Serial No. 443,044. (No model.)

*To all whom it may concern:*

Be it known that we, SAMUEL HAUCK and GEORGE S. COMSTOCK, of Mechanicsburg, in the county of Cumberland and State of Pennsylvania, have invented certain new and useful Improvements in Sawmill-Dogs; and we do hereby declare the following to be a full, clear, and exact description of the invention, such as will enable others skilled in the art to which it appertains to make and use the same.

Our invention relates to an improvement in saw mill dogs,—its object being to produce a saw mill dog which shall be simple in construction, easy to operate and effectual in the performance of its functions.

A further object is to so construct the devices for operating a saw mill dog that the actuating lever can be moved or vibrated without affecting the dog, so that the vibration of the lever can be repeated when the dog shall not have been driven sufficiently into the log at the first operation of the lever and it is desired to force it more firmly into the log.

A further object is to so construct the mechanism for operating a saw mill dog that the part which carries the dog can be raised or lowered independent of the operating lever, when desired.

With these objects in view the invention consists in certain novel features of construction and combinations and arrangements of parts as hereinafter set forth and pointed out in the claims.

In the accompanying drawings: Figure 1 is a side elevation of our improved saw mill dog. Fig. 2 is a view taken at right angles to Fig. 1, showing the operating lever elevated. Fig. 3 is a view similar to Fig. 2, showing the operating lever at its lowest position. Fig. 4 is a view of a modification.

A represents a base block, on one end of which the knee B is mounted and projects upwardly therefrom.

Secured to the knee B by means of bolts or otherwise and extending, preferably, above the same, is a rack bar C. Each longitudinal edge of the rack bar is made with a groove $c$ adapted to receive flanges $c'$ projecting from arms $c^2$ of a sliding block D. The sliding block D is provided with an elongated slot $d$ through which the shank $e$ of the dog E is passed and disposed at right angles to the knee B. One end of the elongated slot $d$ is made deeper than the other end, so that the dog may have a slight pivotal movement.

Supported by the block D at the deeper end of the slot $d$, is a coiled spring $f$, adapted to bear at its upper end against the shank $e$ of the dog E and maintain the same normally in a horizontal position. Instead of the spring $f$, a weight $f'$ may be employed as shown in Fig. 4.

The upper edge of the shank of the dog is made with a series of notches $g$, for the reception of a lug $g'$ on the block D, whereby to prevent any longitudinal movement of the dog. From this construction it will be seen that the dog will be normally maintained in a locked position, and that when it is desired to adjust said dog relatively to the sliding block D, it is simply necessary to depress the dog to disengage the lug $g'$ from the notch $g$, whereupon the dog may be slid to the proper adjustment by hand,—and after the adjustment is effected the dog is released and permitted to again assume its normal horizontal position, with the lug $g'$ in engagement with one of the notches $g$.

The block D is made with two ears $h, h$, in which a short shaft or pin $i$ is mounted, the space between the ears $h, h$, being of a width equal to double the length of the teeth of the rack bar. Mounted on the shaft or pin $i$ is a toothed segment F, the teeth $j$ of which are adapted to mesh with the teeth of the rack bar. The segment F is mounted loosely on the shaft or pin $i$ and adapted to have a sliding movement thereon so that the teeth of said segment may be moved out of mesh with the teeth of the rack bar when it is desired to turn said segment without operating the dog. The segment is provided with a socketed shank $k$ for the reception of a handle G. The teeth of the segment F are so arranged that when the lever G is at the upper extremity of its throw the teeth will not be in mesh with the rack bar, the block D carrying the dog thus being free to be slid up or down independently of the segment, when desired. With the operating lever G and the segment F carried thereby in the upper extremities of their throws as above explained, the block carrying the dog can be readily raised by hand and adjusted to cause the dog to engage the log. The dog being in proper position relative to the log, the lever G will be lowered,—causing the block D and dog E to descend and embed the point of the dog in the log. Should it now become necessary to force the point of the dog farther into the log, the operating segment F is first moved laterally on the shaft or pin $i$ until the teeth of the segment are out of line with the teeth of the rack bar. The segment is then given a partial revolution by throwing the lever G up, and then moved into mesh with the teeth of the rack bar. The operating lever is then operated as before to cause the dog to become more firmly embedded in the log. By this construction the proper amount of force can be applied to embed the dog into the log, and the operating lever can be thrown out of mesh with the rack bar, and it will also be seen that force can be applied in either direction and as many successive times as may be necessary to embed the dog into the log or withdraw it therefrom.

Having fully described my invention, what I claim as new, and desire to secure by Letters Patent, is—

1. The combination with a knee having rack teeth thereon, of a sliding block to slide up and down thereon, said sliding block having a pin or shaft therein of greater length than the width of the rack teeth, a toothed segment loosely mounted and capable of sliding on the pin or shaft whereby the segment may be rocked to operate the block or slide to one side to escape the rack teeth, and a dog connected with the slide block, substantially as set forth.

2. The combination with a knee having rack teeth thereon and grooves in its side edges, of a slide block having tongues which enter and slide in the grooves in the sides of the knee, said block open through the center and having a pin or shaft extending across this open portion, said pin or shaft of greater length than the width of the rack teeth, a toothed segment loosely mounted on the pin or shaft and capable of being slid to one side out of the way of the rack teeth, a notched dog having sliding connection with the slide block, a projection on the slide block, and means for holding the projection in engagement with the dog or a notch therein, substantially as set forth.

In testimony whereof we have signed this specification in the presence of two subscribing witnesses.

SAMUEL HAUCK.
GEO. S. COMSTOCK.

Witnesses:
R. WILSON HURST,
AGNES Q. BOBB.